(12) United States Patent
Mikula et al.

(10) Patent No.: US 12,433,448 B2
(45) Date of Patent: Oct. 7, 2025

(54) KITCHEN APPARATUS FOR ACCOMMODATING A WIRED FOOD MONITORING SENSOR

(71) Applicant: VERSUNI HOLDING B.V., Eindhoven (NL)

(72) Inventors: Christian Mikula, Eindhoven (NL); Bernhard Schratter, Eindhoven (NL); Christian Egger, Eindhoven (NL)

(73) Assignee: VERSUNI HOLDING B.V., Eindhoven (NL)

(*) Notice: Subject to any disclaimer, the term of this patent is extended or adjusted under 35 U.S.C. 154(b) by 0 days.

(21) Appl. No.: 19/114,388

(22) PCT Filed: Aug. 30, 2023

(86) PCT No.: PCT/EP2023/073839
§ 371 (c)(1),
(2) Date: Mar. 21, 2025

(87) PCT Pub. No.: WO2024/061585
PCT Pub. Date: Mar. 28, 2024

(65) Prior Publication Data
US 2025/0261792 A1 Aug. 21, 2025

(30) Foreign Application Priority Data
Sep. 21, 2022 (EP) .................... 22196968

(51) Int. Cl.
*A47J 37/06* (2006.01)
*G01K 1/14* (2021.01)
*G01K 13/00* (2021.01)

(52) U.S. Cl.
CPC ............ *A47J 37/0641* (2013.01); *G01K 1/14* (2013.01); *G01K 13/00* (2013.01); *A47J 2202/00* (2013.01)

(58) Field of Classification Search
None
See application file for complete search history.

(56) References Cited

U.S. PATENT DOCUMENTS

| 11,035,742 B2 | 6/2021 | Moon et al. |
| 2004/0103795 A1 | 6/2004 | McLemore |

(Continued)

FOREIGN PATENT DOCUMENTS

| CN | 1691047 A | 11/2005 |
| CN | 110384397 A | * 10/2019 |

(Continued)

OTHER PUBLICATIONS

Extended European Search Report issued in connection with corresponding EP Application No. 22196968.6 dated Mar. 13, 2023.

*Primary Examiner* — John J Norton
(74) *Attorney, Agent, or Firm* — Maschoff Brennan

(57) ABSTRACT

A kitchen apparatus, comprising a food preparation chamber, is provided. The kitchen apparatus also includes a first housing portion and a second housing portion movable relative to each other to enable the food preparation chamber to be opened and closed. At least part of a channel for receiving at least one wire, e.g. wire(s) connected to a food monitoring sensor, is located at an interface between the first housing portion and the second housing portion so as to permit routing of the at least one wire received in the channel into the food preparation chamber.

14 Claims, 6 Drawing Sheets

(56) References Cited

U.S. PATENT DOCUMENTS

2005/0276892 A1   12/2005  McLemore
2017/0167733 A1    6/2017  Böckler et al.
2020/0297147 A1*  9/2020  Ahn .................... H05B 1/0269

FOREIGN PATENT DOCUMENTS

| | | | |
|---|---|---|---|
| CN | 111035271 | A | 4/2020 |
| CN | 210540979 | U | 5/2020 |
| CN | 111818826 | A | 10/2020 |
| CN | 212186222 | U | 12/2020 |
| CN | 113040595 | A * | 6/2021 |
| CN | 217365464 | U | 9/2022 |
| KR | 20190002709 | U | 10/2019 |
| KR | 20210156581 | A | 12/2021 |
| RU | 2067412 | C1 | 10/1996 |
| WO | 2010030726 | A1 | 3/2010 |

\* cited by examiner

KITCHEN APPARATUS FOR ACCOMMODATING A WIRED FOOD MONITORING SENSOR

CROSS-REFERENCE TO RELATED APPLICATIONS

The present application is a U.S. National Phase application under 35 U.S.C. § 371 of International Application No. PCT/EP2023/073839, filed on Aug. 30, 2023, which claims the benefit of European Patent Application No. 22196968.6, filed on Sep. 21, 2022. These applications are hereby incorporated by reference herein.

FIELD OF THE INVENTION

This invention relates to routing of wire(s) of a food monitoring sensor into a closed food preparation chamber of a kitchen apparatus having a first housing portion and a second housing portion that are moveable relative to each other to enable opening and closing of the food preparation chamber.

BACKGROUND OF THE INVENTION

The use of sensors in food preparation chambers of kitchen appliances is well known. A wireless or wired connection to the sensor enables communication with the kitchen appliance.

The most common sensor arrangement is a food temperature probe insertable into a piece of food, to sense a core temperature of food. The connection to such a food temperature probe tends to be wired, in other words via a wire.

A disadvantage of the wired connection to the sensor is that the wire can be damaged and/or interfered with to accidentally dislodge the sensor, in particular by the extending of the wire between the outside and the inside of the food preparation chamber.

CN 217 365 464 U is an air fryer comprising a heating element, a circulaton system and a food cooking chamber. The air fryer also has a first housing portion and a second housing portion, which is movable relative to each other to enable the food cooking chamber to be opened and closed. Its first housing portion has a U-shape wire notch at its open edge for receiving a wire connected to a temperature sensor, with a sealing element at the wire notch. A hole is configured though the sealing element to form a channel to permit routing of the wire into the food cooking chamber.

SUMMARY OF THE INVENTION

The invention is defined by the claims.

According to examples in accordance with an aspect of the invention, there is provided a kitchen apparatus comprising: a food preparation chamber; a first housing portion; a second housing portion, the first housing portion and the second housing portion being movable relative to each other to enable the food preparation chamber to be opened and closed; and a channel for receiving at least one wire connected to a food monitoring sensor, at least part of the channel being at an interface between the first housing portion and the second housing portion so as to permit routing of the at least one wire received in the channel into the food preparation chamber.

At least part of the channel being at the interface between the first housing portion and the second housing portion may mean that a first surface of the first housing portion faces a second surface of the second housing portion, with the channel being defined between the first and second surfaces.

The channel may assist to minimize the risk of damage to the at least one wire by pinching between the first and second housing portions. This can assist to improve the longevity of the at least one wire. Similarly, the channel may assist to minimize the risk of the at least one wire causing damage, e.g. scratching and/or permanent deformation, to edges of the first and second housing portions at the interface.

The channel may further lessen the risk of unintentional disconnection of the at least one wire from a connection point external to the food preparation chamber.

In certain embodiments, the channel can assist to minimize uncontrolled release of gas from the closed food preparation chamber associated with, when no such channel is provided, the at least one wire opening up a gap at the interface between the first and second housing portions.

Moreover, by at least part of the channel being at the interface between the first and second housing portions, the user is enabled to, following arrangement of the food monitoring sensor in the food, straightforwardly route the at least one wire extending from the food monitoring sensor from the inside to the outside of the food preparation chamber with minimal disruption to the placement of the food monitoring sensor, for example with less risk of the food monitoring sensor falling out of the food.

In some embodiments, one of the first and second housing portions is a drawer that is slidably moveable relative to the other of the first and second housing portions to enable the food preparation chamber to be opened and closed. This may provide a particularly convenient way of accessing the food preparation chamber in order to receive food, as well as the above-mentioned food monitoring sensor, therein.

In other embodiments, one of the first and second housing portions is a lid or door that is moveable relative to the other of the first and second housing portions to enable the food preparation chamber to be opened or closed.

Such relative movement of the lid or door may, for example, be via the lid or door being pivotable relative to, and/or detachable from, the other of the first and second housing portions.

In some embodiments, one of the first and second housing portions comprises a food basket receivable in the food preparation chamber, in particular when the food preparation chamber is closed.

In embodiments in which one of the first and second housing portions is a drawer that is slidably moveable relative to the other of the first and second housing portions, the food basket is advantageously included in the drawer.

This can facilitate monitoring of the food being cooked in the food preparation chamber because the food monitoring sensor can be straightforwardly arranged in the food basket, e.g. in food received in the food basket, prior to the food basket being received in the food preparation chamber via sliding of the drawer to close the food preparation chamber.

In some embodiments, at least one of the first and second housing portions comprises a rounded surface that at least partially delimits the channel.

Such a rounded surface may assist to minimize the risk of damage to the at least one wire received in the channel.

The rounded surface can, for example, comprise a concave, in other words U-shaped, surface that extends along at least part of the channel, e.g. the at least part of the channel at the interface between the first and second housing portions.

Such a concave surface can assist to retain the at least one wire within the channel.

As an alternative or in addition to the rounded surface delimiting the channel, the channel may be delimited by a plastic or rubber material, e.g. a molded plastic or rubber material.

Such materials may assist to protect the at least one wire from damage, and may also provide additional electrical insulation.

In some embodiments, the channel is at least partly defined by a groove arranged in, in other words set into, an edge portion of one of the first and second housing portions.

In such embodiments, the edge portion faces a further edge portion of the other of the first and second housing portions. The further edge portion may assist to retain the at least one wire in the groove when the food preparation chamber is closed.

The groove may have any suitable shape. In some embodiments, the groove has a concave cross-sectional shape.

Such a concave cross-sectional shape may assist to protect the at least one wire from damage.

A further groove may be arranged in, in other words set into, the further edge portion, with the channel being defined between the groove and the further groove.

In such embodiments, the channel may, for instance, have a circular or elliptical cross-sectional shape resulting from semicircular or semielliptical cross-sectional shapes of the opposing groove and the further groove.

In alternative embodiments, the groove is arranged in the edge portion but no further groove is arranged in the further edge portion.

In some embodiments, the kitchen apparatus comprises a handle mounted to one of the first and second housing portions via a mounting portion extending between the respective housing portion and the handle.

The handle may facilitate relative movement of the first and second housing portions to open and close the food preparation chamber.

In some embodiments, the handle may be mounted to, and thereby facilitate sliding of, one of the first and second housing portions in the form of a drawer, e.g. a drawer comprising a food basket, relative to the other of the first and second housing portions.

In some embodiments, at least part of the channel may be arranged in, e.g. set into a surface of, the mounting portion. This may provide a particularly ergonomic position for the channel, since, following arrangement of the food in the food basket and/or in the food preparation chamber, the user can straightforwardly locate the at least one wire in the channel while in the process of manipulating the handle to close the food preparation chamber.

In some embodiments, the kitchen apparatus comprises a closure member arranged to close the channel when the at least one wire is not received in the channel.

The closure member may assist to minimize or prevent gases from escaping from the food preparation chamber via the channel when the channel is not accommodating the at least one wire. Thus, the closure member may assist to alleviate efficiency of kitchen apparatus being compromised due to the inclusion of the channel, when the channel is not being used to route the at least one wire into the food preparation chamber.

In some embodiments, the closure member is biased into a closed position in which the channel is closed by the closure member when the at least one wire is not received in the channel.

Such biasing can be implemented in any suitable manner. In some embodiments, the biasing is achieved by the closure member being spring-loaded, with a spring urging the closure member to close the channel.

In such embodiments, the biasing may be overcome by the at least one wire being received in the channel. The at least one wire accommodated in the channel may force the closure member back against the bias urging the closure member into the closed position, for example against the force exerted by the above-mentioned spring.

In some embodiments, the closure member includes a rounded profile for contacting the at least one wire when the at least one wire is received in the channel.

This rounded profile may assist to minimize or prevent the at least one wire being damaged by the closure member pressing against the at least one wire when the at least one wire is received in the channel.

In some embodiments, the kitchen apparatus comprises one or more labyrinth seals and/or deformable part(s) and/or flexible part(s) mounted in, or provided together with the channel to hold the at least one wire when inserted in the channel, and to seal the channel when no wire is received in the channel.

Such components can, for example, be made of an elastomeric material, such as rubber.

In some embodiments, the kitchen apparatus comprises a wire retention and release mechanism configured to releasably retain the at least one wire following receiving of the at least one wire in the channel. Releasably retaining the at least one wire in this manner may assist to reduce the risk of the at least one wire being damaged, e.g. by being pinched between the first and second housing portions.

In some embodiments, the wire retention and release mechanism is configured to urge release of the retained wire(s) in response to movement of the first and second housing portions relative to each other to open the food preparation chamber.

This release of the at least one wire may assist to minimize the risk of unintentional deformation and/or disconnection of the at least one wire, for example at a user-accessible connection point, e.g. jack socket, due to the relative movement of the first and second housing portions to open the food preparation chamber.

In embodiments in which one of the first and second housing portions is a drawer, the length of the at least one wire between the interface and the user-accessible connection point may be shorter than the length of travel of the drawer required to open the food preparation chamber.

The risk of unintentional deformation and/or disconnection of the at least one wire in such embodiments may nonetheless be lessened due to the release of the at least one wire implemented by the wire retention and release mechanism.

Moreover, user convenience may be enhanced, since the user need only open the food preparation chamber in order to cause the wire retention and release mechanism to urge release of the retained wire(s).

The wire retention and release mechanism may comprise a wire reception portion configured to align with the channel to enable release of the at least one wire from the wire reception portion via the channel when the food preparation chamber is open, and to be displaced relative to the channel to retain the at least one wire in the wire reception portion while the food preparation chamber is closed.

The wire reception portion may be configured to align with the channel in response to the first and second housing portions being moved relative to each other to open the food preparation chamber.

In this way, the wire retention and release mechanism may urge release of the retained wire(s).

Alternatively or additionally, the wire reception portion may be configured to be displaced relative to the channel in response to user actuation and/or to the first and second housing portions being moved relative to each other to close the food preparation chamber.

In some embodiments, the closure member configured to close the channel when the at least one wire is not received in the channel is further configured to urge the wire(s) out of the wire reception portion and out of the channel, when the wire reception portion is aligned with the channel.

In some embodiments, the kitchen apparatus comprises a user-accessible connection point at which the at least one wire is electrically connectable to a cooking control and/or monitoring system.

The user-accessible connection point may, for example, be arranged at an exterior of a kitchen appliance, e.g. air fryer, included in the kitchen apparatus.

In some embodiments, the user-accessible connection point comprises a socket, e.g. a jack socket, into which a plug, e.g. a jack plug, at an end of the at least one wire is locatable to electrically connect the at least one wire to the cooking control and/or monitoring system.

In some embodiments, the cooking control and/or monitoring system is included in the kitchen apparatus and comprises a user interface configured to communicate, e.g. display, cooking monitoring information based on sensor signals communicated from the food monitoring sensor via the at least one wire.

The user-accessible connection point, e.g. jack socket, may be adjacent to the user interface, e.g. display.

In some embodiments, the kitchen apparatus comprises the at least one wire, and the food monitoring sensor arrangeable in the food preparation chamber to monitor food received therein while the at least one wire is routed via the channel from the food monitoring sensor to outside the food preparation chamber.

In at least some embodiments, the food monitoring sensor comprises a food temperature monitoring probe.

Such a food temperature monitoring probe may be insertable into food received in the food preparation chamber in order to sense a core temperature of the food during cooking within the food preparation chamber.

In other embodiments, the kitchen apparatus is provided, e.g. supplied to the user, separately from the food monitoring sensor and/or the at least one wire.

More generally, the at least one wire may be formed of any suitably thermally robust material, in particular suitably thermally robust insulating material(s) surrounding electrically conductive material(s), in order to enable the at least one wire to withstand cooking conditions inside the food preparation chamber.

In some embodiments, the at least one wire comprises a fluoropolymer insulating material, such as polytetrafluoroethylene.

The kitchen apparatus can include, or be, a kitchen appliance, such as a cooking appliance.

Examples of cooking appliances include an air fryer, a convection oven, a food steamer, and so on.

Particular mention is made of the kitchen apparatus comprising, or being, an air fryer.

The air fryer can achieve a frying effect with no or only a relatively small amount of cooking oil being required. It is nonetheless desirable to monitor the cooking process taking place in the air fryer's food preparation chamber with the above-mentioned food monitoring sensor, e.g. food temperature probe, to ensure that the desired cooking result is attained.

The slight overpressure in the food preparation chamber, in other words cooking chamber, of an air fryer, may provide an increased risk of uncontrolled release of gas from the closed food preparation chamber in the scenario that the at least one wire opens up a gap at the interface between the first and second housing portions. Such uncontrolled gas release towards the user can compromise the user's comfort and safety. The avoidance of such a gap being opened up due to the channel at the interface between the first and second housing portions may assist to reduce this gas release-related risk.

In some embodiments, the kitchen apparatus comprises a heating element and a circulation system arranged to circulate gas heated by the heating element in the food preparation chamber. In such embodiments, the kitchen apparatus can be regarded as comprising, for example, a convection oven or an air fryer.

In some embodiments, the food preparation chamber has, when orientated for use, a top and a bottom, with the circulation system being arranged to circulate said gas upwardly through food received in the food preparation chamber in the direction of the top and/or downwardly through food received in the food preparation chamber in the direction of the bottom.

This upward and/or downward circulation of gas, e.g. air, smoke and/or steam, through the food received in the food preparation chamber may provide the above-described frying effect provided by an air fryer.

These and other aspects will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
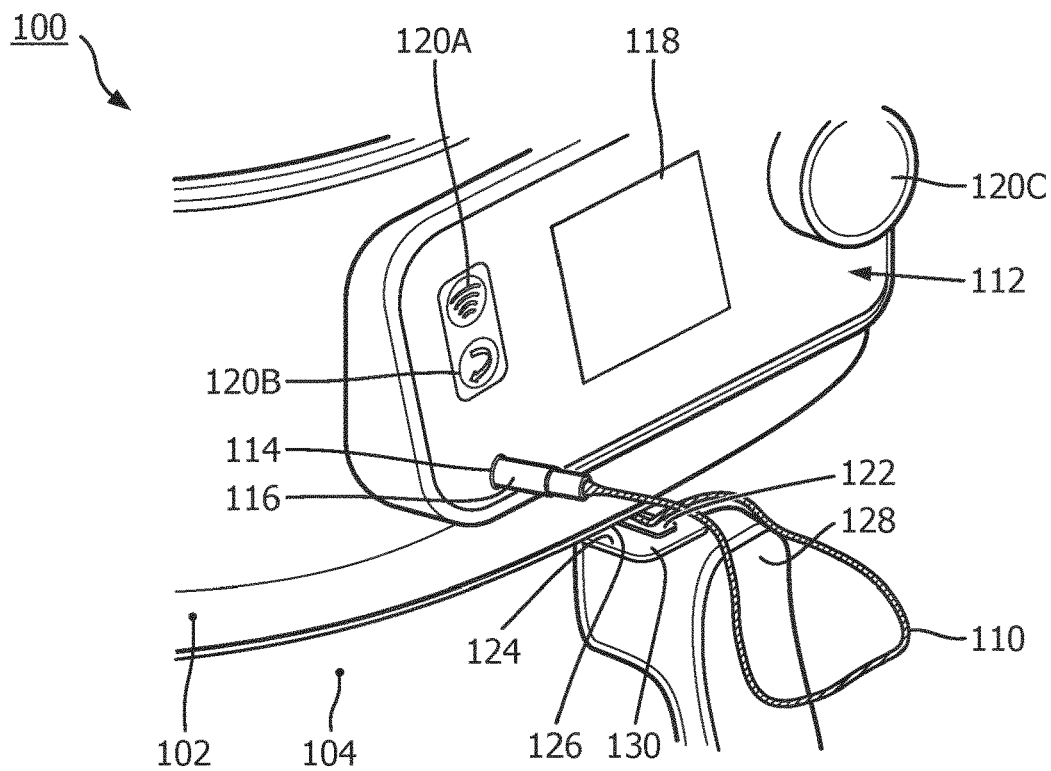
FIG. 1 shows part of a kitchen apparatus according to an example.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a kitchen apparatus comprising a food preparation chamber. The kitchen apparatus also includes a first housing portion and a second housing portion movable relative to each other to enable the food preparation chamber to be opened and closed. At least part of a channel for receiving at least one wire, e.g. wire(s) connected to a food monitoring sensor, is located at an interface between the first housing portion and the second housing portion so as to permit routing of the at least one wire received in the channel into the food preparation chamber.

FIG. 1 shows part of a kitchen apparatus 100 according to an example. The kitchen apparatus 100 comprises a first housing portion 102 and a second housing portion 104. The first and second housing portions 102, 104 are movable relative to each other to enable a food preparation chamber (not visible in FIG. 1) to be opened and closed.

The kitchen apparatus 100 can include any type of kitchen appliance, such as an air fryer, a convection oven, a food steamer, and so on.

Particular mention is made of the kitchen apparatus 100 comprising, or being, an air fryer. An example of this is shown in FIG. 1.

The air fryer can achieve a frying effect with no or only a relatively small amount of cooking oil being required. It is nonetheless desirable to monitor the cooking process taking place in the air fryer's food preparation chamber with a suitable food monitoring sensor, e.g. food temperature probe, to ensure that the desired cooking result is attained. Facilitating food monitoring via such a food monitoring sensor is a key aim of the present disclosure, as will be described in more detail herein below.

In at least some embodiments, the kitchen apparatus 100 comprises a heating element and a circulation system (not visible) arranged to circulate gas heated by the heating element in the food preparation chamber. In such embodiments, the kitchen apparatus 100 can be regarded as comprising, for example, a convection oven or an air fryer.

In some embodiments, the food preparation chamber has, when orientated for use, a top and a bottom, with the circulation system being arranged to circulate said gas upwardly through food received in the food preparation chamber in the direction of the top and/or downwardly through food received in the food preparation chamber in the direction of the bottom.

This upward and/or downward circulation of gas, e.g. air, smoke and/or steam, through the food received in the food preparation chamber may provide the above-described frying effect provided by an air fryer.

The relative movement of the first and second housing portions 102, 104 can be implemented in any suitable manner provided that the food preparation chamber can be opened and closed, for example in order to enable food to be placed within, and removed from, the food preparation chamber.

In some embodiments, such as those shown in FIGS. 1 to 4, one of the first and second housing portions 102, 104 is a drawer that is slidably moveable relative to the other of the first and second housing portions 104, 102 to enable the food preparation chamber 106 to be opened and closed.

In the non-limiting examples shown in FIGS. 1 to 4, the second housing portion 104 constitutes such a drawer, with the second housing portion 104 being slidable in and out of a statically mounted first housing portion 102 in order to close and open the food preparation chamber 106 respectively.

In other embodiments (not visible in the Figures), one of the first and second housing portions 102, 104 is a lid or door that is moveable relative to the other of the first and second housing portions 104, 102 to enable the food preparation chamber 106 to be opened or closed.

Such relative movement of the lid or door may, for example, be via the lid or door being pivotable relative to, and/or detachable from, the other of the first and second housing portions 104, 102.

Figure 2:
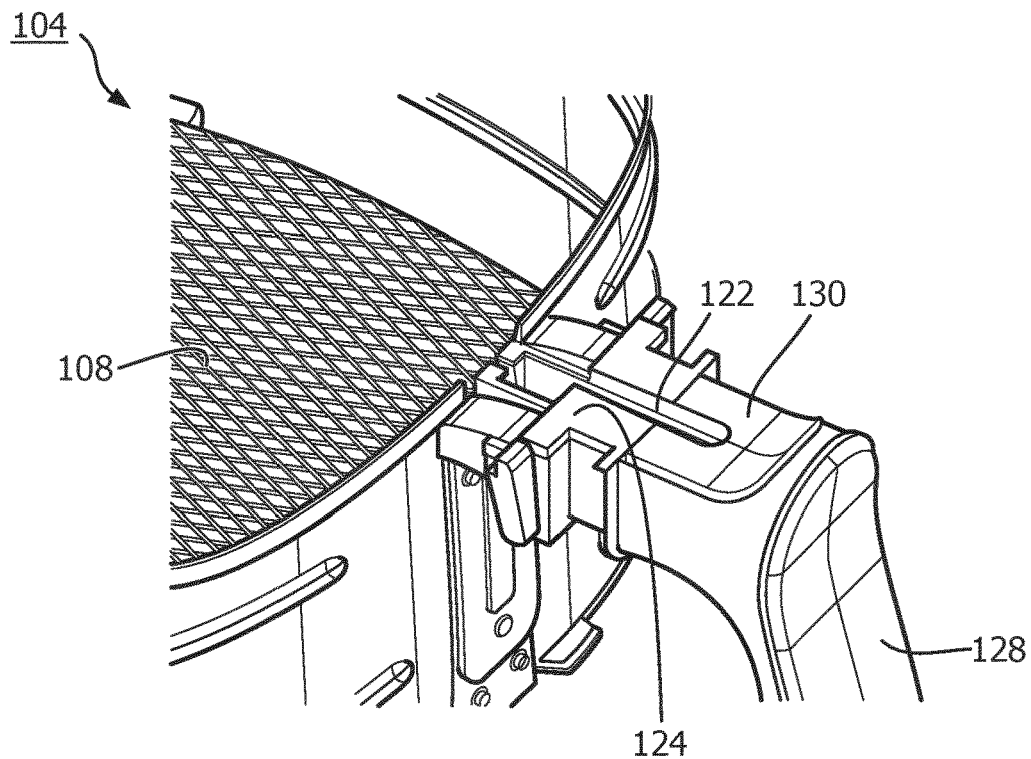
FIG. 2 shows a housing portion of a kitchen apparatus according to an example.

In some embodiments, such as that shown in FIG. 2, one of the first and second housing portions 102, 104 comprises a food basket receivable in the food preparation chamber 106, in particular when the food preparation chamber 106 is closed.

In such embodiments, the food basket may comprise a perforate food supporting portion 108 on which food, e.g. for cooking/baking/frying/steaming in the food preparation chamber 106, may be supported.

In embodiments in which one of the first and second housing portions 102, 104 is a drawer that is slidably moveable relative to the other of the first and second housing portions 104, 102, the food basket is advantageously included in the drawer. This can facilitate monitoring of the food being cooked in the food preparation chamber 106 because a food monitoring sensor, such as a food temperature probe, can be straightforwardly arranged in the food basket, e.g. in food received in the food basket, prior to the food basket being received in the food preparation chamber 106 via sliding of the drawer to close the food preparation chamber 106.

Such a food monitoring sensor may, more generally, be arrangeable in the food preparation chamber 106 to monitor food received therein while wire(s) 110 extending from the food monitoring sensor is or are routed from the inside to the outside of the food preparation chamber 106.

In some embodiments, such as that shown in FIG. 1, the kitchen apparatus 100 comprises a cooking control and/or monitoring system 112, and a user-accessible connection point 114 at which the at least one wire 110 is electrically connectable to the cooking control and/or monitoring system 112.

The user-accessible connection point 114 may, for example, be arranged at an exterior of the kitchen appliance, e.g. air fryer, included in the kitchen apparatus 100.

In some embodiments, such as that shown in FIG. 1, the user-accessible connection point 114 comprises a socket, e.g. a jack socket, into which a plug 116, e.g. a jack plug, at an end of the at least one wire 110 is locatable to electrically connect the at least one wire 110 to the cooking control and/or monitoring system 112.

In some embodiments, the cooking control and/or monitoring system 112 includes a user interface 118 configured to communicate, e.g. display, cooking monitoring information based on sensor signals communicated from the food monitoring sensor via the at least one wire 110.

Alternatively or additionally, the cooking control and/or monitoring system 112 may comprise one or more user input interfaces 120A, 120B, 120C configured to permit the user to select cooking control parameters, such as a temperature of the food preparation chamber 106 and/or duration of heating of the food preparation chamber 106 via control of the heating element, and/or to permit the user to connect, e.g. wirelessly connect, the cooking control and/or monitoring system 112 to an external device (not visible), such as a smart phone or tablet computer, separate from the kitchen appliance.

It is noted, more generally, that the at least one wire 110 may provide a facile way of communicating sensor signals from the food monitoring sensor to the outside of the food preparation chamber 106. However, the at least one wire 110 can risk becoming damaged by being pinched between the first and second housing portions 102, 104 when the cooking chamber 106 is closed. The at least one wire 110 can also cause damage, e.g. scratching and/or permanent deformation, to edges of the first and second housing portions 102, 104 at the interface therebetween.

In some instances, an uncontrolled release of gas from the closed food preparation chamber 106 can result from the at least one wire 110 opening up a gap at the interface between the first and second housing portions 102, 104.

There is also a risk that the at least one wire 110 is accidentally pulled from the user-accessible connection point 114, for instance by the plug 116 being pulled from the above-mentioned socket included in, or defining, the user-accessible connection point 114, when the first and second housing portions are moved relative to each other to open or close the food preparation chamber 106.

For at least these reasons, the kitchen apparatus 100 comprises a channel 122 for receiving the at least one wire 110, with at least part of the channel 122 being at the interface between the first housing portion 102 and the second housing portion 104 so as to permit routing of the at least one wire 110 into the food preparation chamber 106.

At least part of the channel 122 being at the interface between the first housing portion 102 and the second housing portion 104 may mean that a first surface of the first housing portion 102 faces a second surface of the second housing portion 104, with the channel 122 being defined between the first and second surfaces.

The channel 122 may assist to minimize the risk of damage to the at least one wire 110 by pinching between the first and second housing portions 102, 104, as well as lessening the risk of unintentional disconnection of the at least one wire 110 from the user-accessible connection point 114.

Moreover, by the channel 122 being arranged at the interface between the first and second housing portions 102, 104, the user is enabled to, following arrangement of the food monitoring sensor in the food, straightforwardly route the at least one wire 110 from the inside to the outside of the food preparation chamber 106 with minimal disruption to the placement of the food monitoring sensor.

The channel 122 can be regarded as a grommet for the at least one wire 110 of the food monitoring sensor, e.g. food temperature probe. This is owing to the channel's 122 function in protecting the at least one wire 110 from opposing edges of the first and second housing portions 102, 104 at the interface.

In some embodiments, at least one of the first and second housing portions 102, 104 comprises a rounded surface that at least partially delimits the channel 122.

Such a rounded surface may assist to minimize the risk of damage to the at least one wire 110.

The rounded surface can, for example, comprise a concave, in other words U-shaped, surface that extends along at least part of the channel 122, e.g. the at least part of the channel 122 at the interface between the first and second housing portions 102, 104.

Such a concave surface can assist to retain the at least one wire 110 within the channel 122.

As an alternative or in addition to the rounded surface delimiting the channel 122, the channel 122 may be delimited by a plastic or rubber material, e.g. a molded plastic or rubber material.

Such materials may assist to protect the at least one wire 110 from damage, and may also provide additional electrical insulation.

In some embodiments, such as those shown in FIGS. 1 and 2, the channel 122 is at least partly defined by a groove arranged in, in other words set into, an edge portion 124 of one of the first and second housing portions 102, 104.

In such embodiments, the edge portion 124 faces a further edge portion 126 of the other of the first and second housing portions 104, 102. The further edge portion 126 may assist to retain the at least one wire 110 in the groove 122 when the food preparation chamber 106 is closed.

In embodiments in which one of the first and second housing portions 102, 104 is a drawer, the edge portion 124 may be an edge portion 124 of the drawer. The edge portion 124 of the drawer thus faces the further edge portion 126 of the other of the first and second housing portions 104, 102.

As shown in FIGS. 1 and 2, the edge portion 124 of the drawer 124 may be an upper edge portion, and the further edge portion 126 may be a lower edge portion, when the kitchen apparatus 100 is orientated for use.

The groove may have any suitable shape. In some embodiments, such as those shown in FIGS. 1 and 2, the groove has a concave cross-sectional shape.

Such a concave cross-sectional shape may assist to protect the at least one wire 110 from damage.

Whilst not visible in the Figures, a further groove may be arranged in, in other words set into, the further edge portion 126, with the channel 122 being defined between the groove and the further groove.

In such embodiments, the channel 122 may, for instance, have a circular or elliptical cross-sectional shape when the groove and the further groove each have semicircular or semielliptical cross-sectional shapes.

In alternative embodiments, no further groove is arranged in the further edge portion 126.

In some embodiments, such as those shown in FIGS. 1 and 2, the kitchen apparatus 100 comprises a handle 128 mounted to one of the first and second housing portions 102, 104 via a mounting portion 130 extending between the respective housing portion and the handle 128.

The handle 128 may facilitate relative movement of the first and second housing portions 102, 104 to open and close the food preparation chamber 106.

In some embodiments, such as those shown in FIGS. 1 and 2, the handle 128 may be mounted to, and thereby facilitate sliding of, one of the first and second housing portions 102, 104 in the form of a drawer, e.g. comprising a food basket, relative to the other of the first and second housing portions 104, 102.

In some embodiments, at least part of the channel 122 may be arranged in, e.g. set into a surface of, the mounting portion 130. This may provide a particularly ergonomic position for the channel 122, since, following arrangement of the food in the food basket and/or in the food preparation chamber 106, the user can straightforwardly locate the at least one wire 110 in the channel 122 while in the process of manipulating the handle 128 to close the food preparation chamber 106.

In some embodiments, the kitchen apparatus 100 comprises the at least one wire 110, and the food monitoring sensor arrangeable in the food preparation chamber 106 to monitor food received therein while the at least one wire is routed via the channel 122 from the food monitoring sensor to outside the food preparation chamber 106.

In at least some embodiments, the food monitoring sensor comprises, or is, a food temperature probe.

Such a food temperature probe may be insertable into food received in the food preparation chamber 106 in order to sense a core temperature of the food during cooking within the food preparation chamber 106.

In other embodiments, the kitchen apparatus 100 is provided, e.g. supplied to the user, separately from the food monitoring sensor and/or the at least one wire 110.

More generally, the at least one wire 110 may be formed of any suitably thermally robust material, in particular suitably thermally robust insulating material(s) surrounding electrically conductive material(s), in order to enable the at least one wire 110 to withstand the cooking conditions inside the food preparation chamber 106.

In some embodiments, the at least one wire 110 comprises a fluoropolymer insulating material, such as polytetrafluoroethylene.

Figure 3:
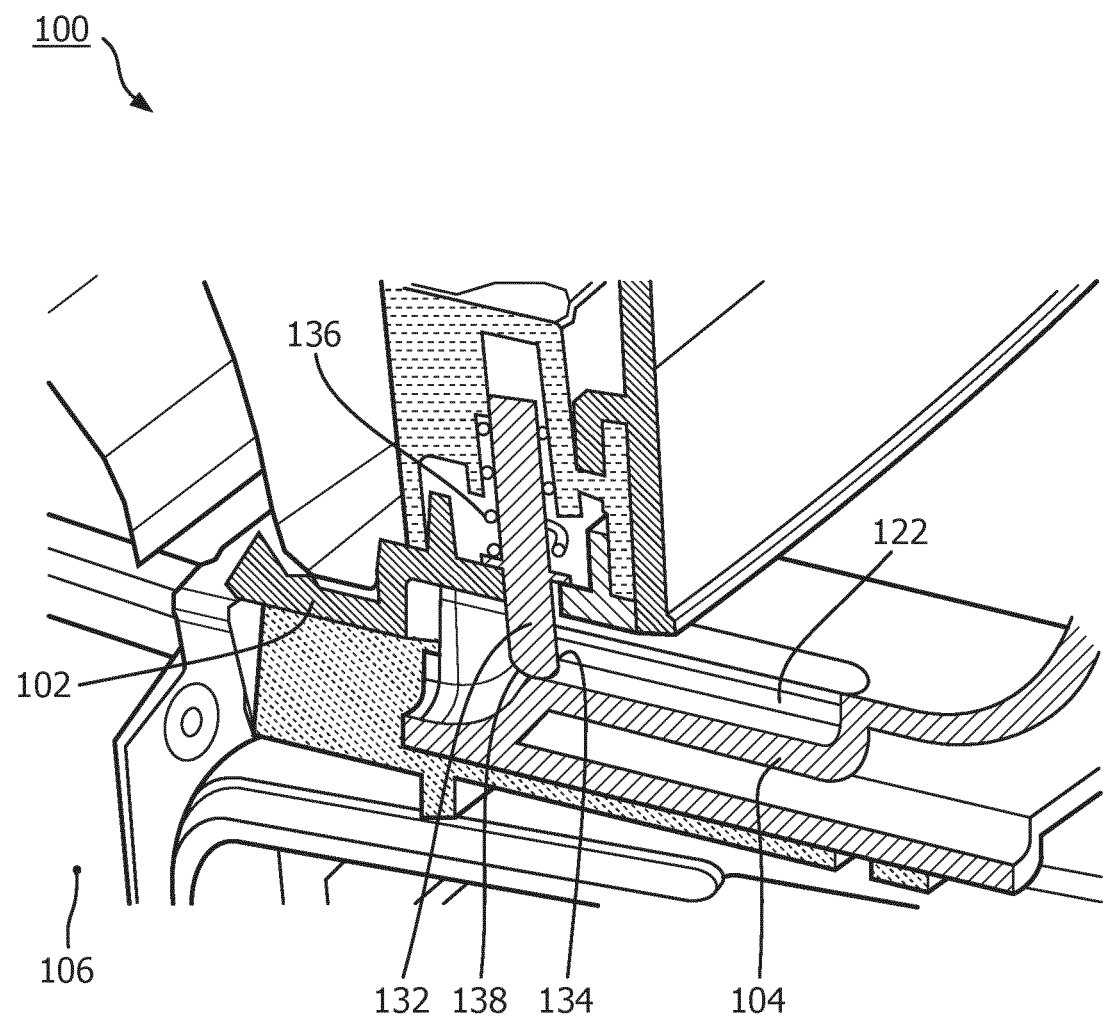
FIG. 3 provides a cutaway view of a kitchen apparatus according to another example.
Figure 4:
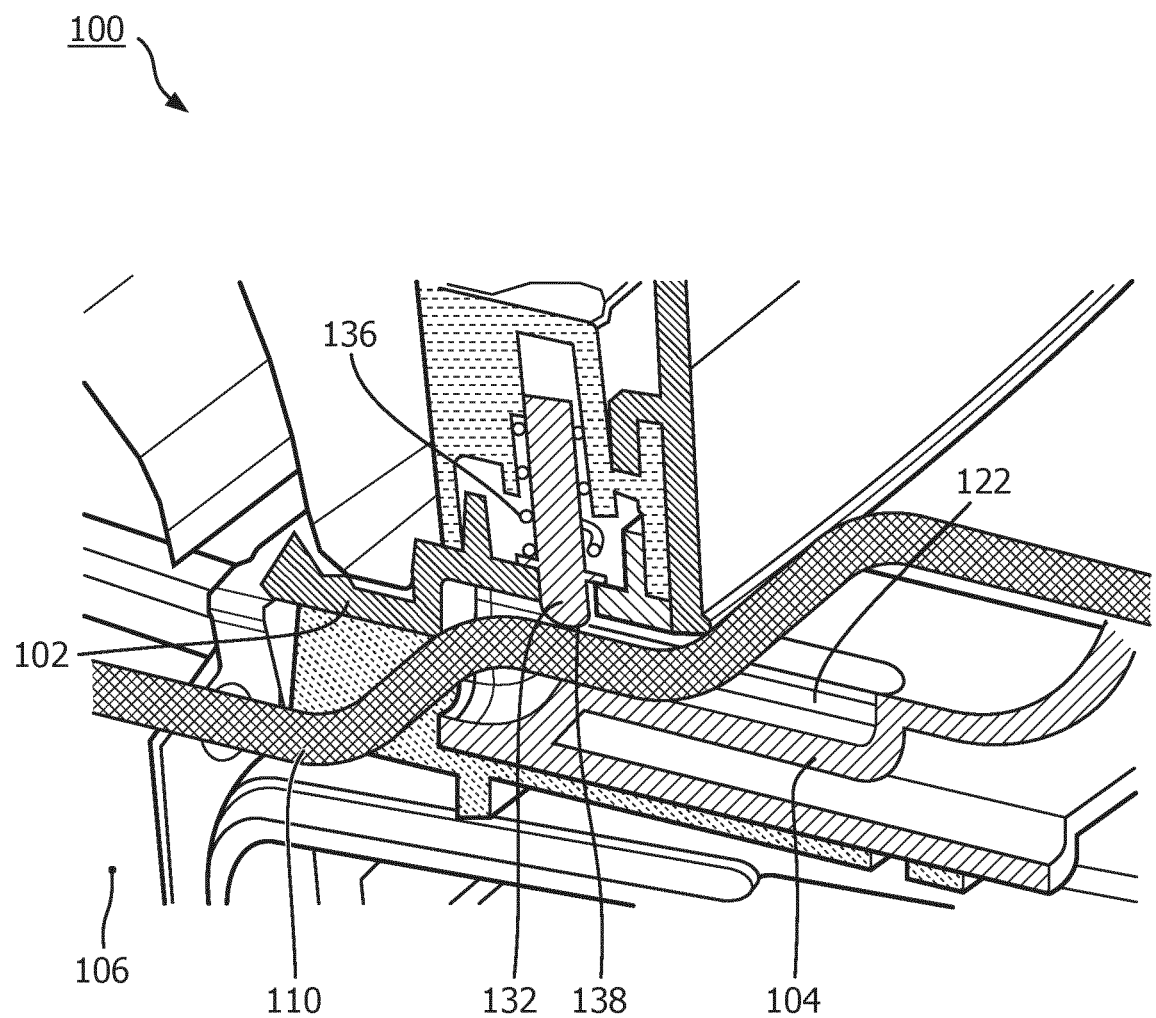
FIG. 4 shows a wire being guided into a food preparation chamber of the kitchen apparatus shown in FIG. 3.
Figure 5:
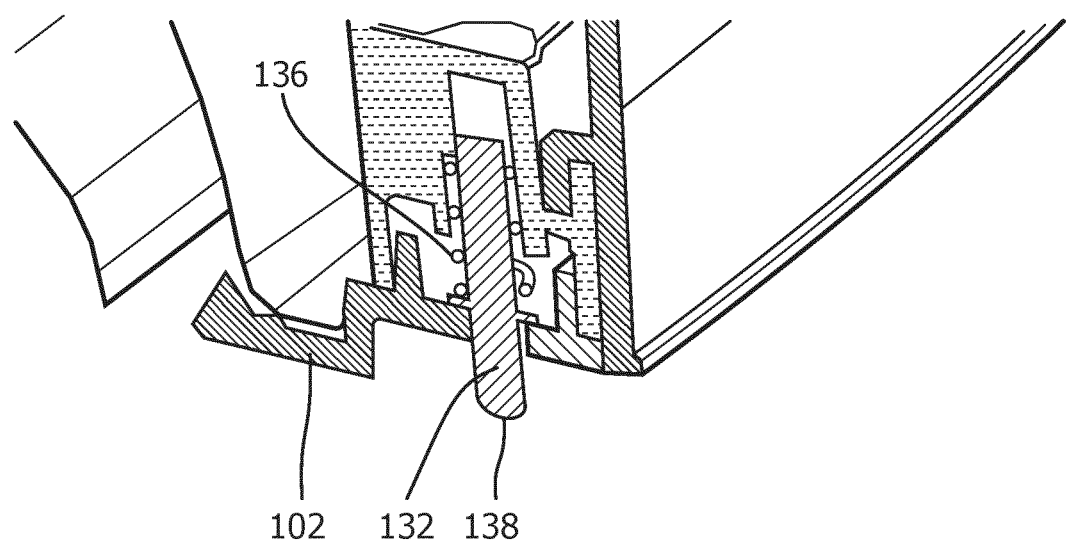
FIG. 5 shows just one of the housing portions of the kitchen apparatus shown in FIGS. 3 and 4.

In some embodiments, such as that shown in FIGS. 3 to 5, the kitchen apparatus 100 comprises a closure member 132 arranged to close the channel 122 when the at least one wire 110 is not received in the channel 122.

The closure member 132 can be regarded as a gate that can assist to minimize or prevent gases from escaping from the food preparation chamber 106 via the channel 122 when the channel 122 is not accommodating the at least one wire 110. Thus, the closure member 132 may assist to alleviate efficiency of kitchen apparatus 100 being compromised due to the inclusion of the channel 122, when the channel 122 is not being used to route the at least one wire 110 into the food preparation chamber 106.

The closure member 132 may close the channel 122 by protruding across part 134 of the channel 122 that would otherwise be occupied by the at least one wire 110.

In some embodiments, such as that shown in FIGS. 3 to 5, the closure member 132 is biased into a closed position in which the channel 122 is closed by the closure member 132 when the at least one wire 110 is not received in the channel 122.

Such biasing can be implemented in any suitable manner. In some embodiments, such as that shown in FIGS. 3 to 5, the biasing is achieved by the closure member 132 being spring-loaded, with a spring 136 urging the closure member 132 to close the channel 122.

In such embodiments, the biasing may be overcome by the at least one wire 110 being received in the channel 122. In other words, if the at least one wire 110 is present in the channel 122, the closure member 132 may be pushed upwards when the food preparation chamber 106 is closed by the first and second housing portions 102, 104 being in position. This is shown in FIG. 4.

Thus, the at least one wire 110 accommodated in the channel 122 may force the closure member 132 back against the bias urging the closure member 132 into the closed position, in this non-limiting example against the force exerted by the spring 136.

The closure member 132 may include a rounded profile 138 for contacting the at least one wire 110 when the at least one wire 110 is received in the channel 122.

This rounded profile 138 may assist to minimize or prevent the at least one wire 110 being damaged by the closure member 132 pressing against the at least one wire 110 when the at least one wire 110 is received in the channel 122.

In some embodiments, the kitchen apparatus 100 comprises one or more labyrinth seals and/or deformable part(s) and/or flexible part(s) (not visible) mounted in, or provided together with the channel 122 to hold the at least one wire 110 when inserted in the channel 122, and to seal the channel 122 when no wire 110 is received in the channel 122.

Such components can, for example, be made of an elastomeric material, such as rubber.

FIG. 5 shows the first housing portion 102 with the closure member 132 when the second housing portion 104, in this non-limiting example being in the form of a drawer, is moved to open the food preparation chamber 106, e.g. with the food basket being concomitantly removed.

In a particular non-limiting example, the kitchen apparatus 100 comprises a drawer assembly comprising one of the housing portions 102, 104 in the form of a drawer that is slidable relative to the other of the housing portions 104, 102 in the form of a pan. The drawer comprises the food basket, and the handle 128 is mounted to the food basket.

In such an example, the channel 122, in other words grommet, may be integrated into the handle 128 of the food basket.

A significant advantage of this particular example is that the user can place the food into the food basket, and insert the food monitoring sensor, e.g. food temperature probe, into the food while the food basket is displaced relative to the pan, e.g. the pan of an air fryer.

As the at least one wire 110 and thus the food monitoring sensor is fixed by the channel 122 in a defined position, the food basket, the food received therein, the at least one wire 110 and the food monitoring sensor can easily be placed in the food preparation chamber 106 by sliding the drawer relative to the pan to close the food preparation chamber 106.

In this way, unintentional displacement of the food monitoring sensor during closing of the food preparation chamber 106 via sliding of the drawer may be minimized or even eliminated.

When the drawer is in place to close the food preparation chamber 106, the user can connect the at least one wire 110 to the user-accessible connection point 114, e.g. jack socket. The user-accessible connection point 114 may be conveniently positioned next to the user interface 118, e.g. display, as shown in FIG. 1.

Figure 6:
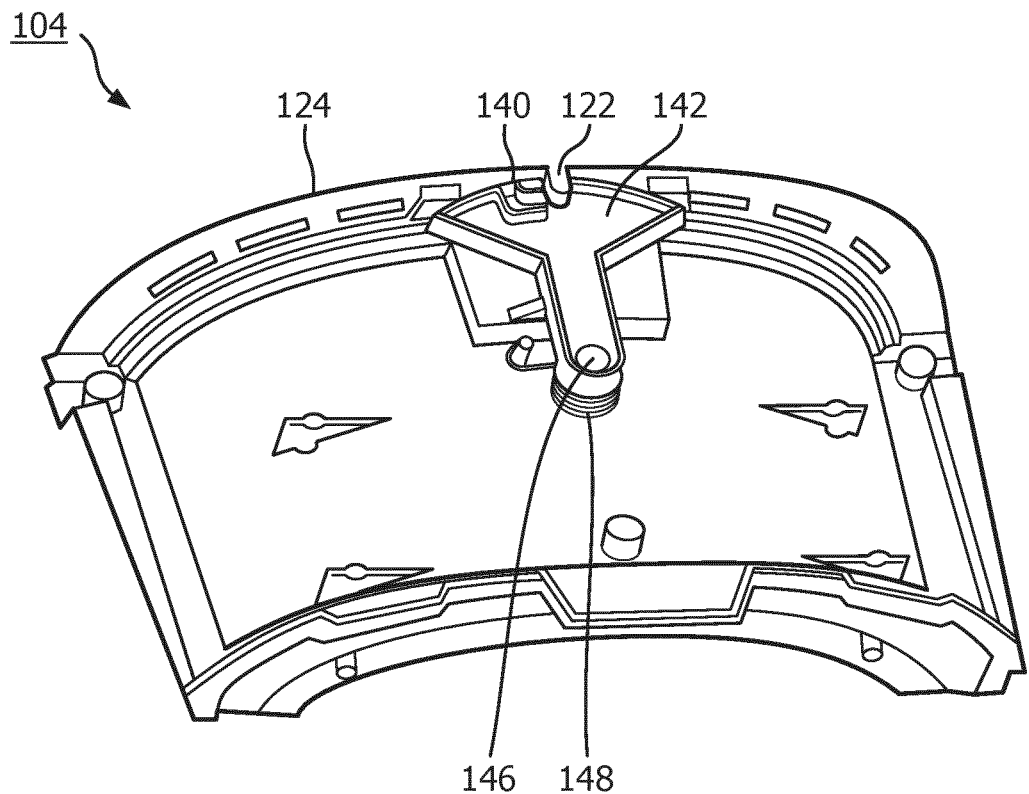
FIG. 6 shows part of a housing portion of a kitchen apparatus according to yet another example.

It is noted that the channel 122 need not be integrated into the handle 128, and may be provided at an alternative position at the interface between the first and second housing portions 102, 104. The channel 122 may, for example, be arranged in an edge portion of a front panel defining the second housing portion 104, as shown in FIG. 6. This may, for instance, be a front panel of a drawer.

Figure 7:
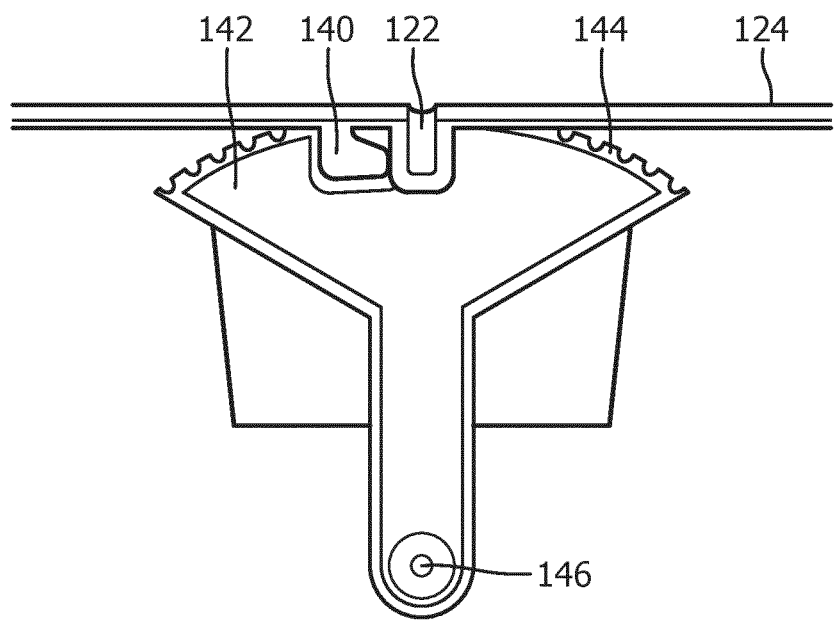
FIG. 7 provides a side view of a wire retention and release mechanism mounted to the housing portion shown in FIG. 6.
Figure 8:
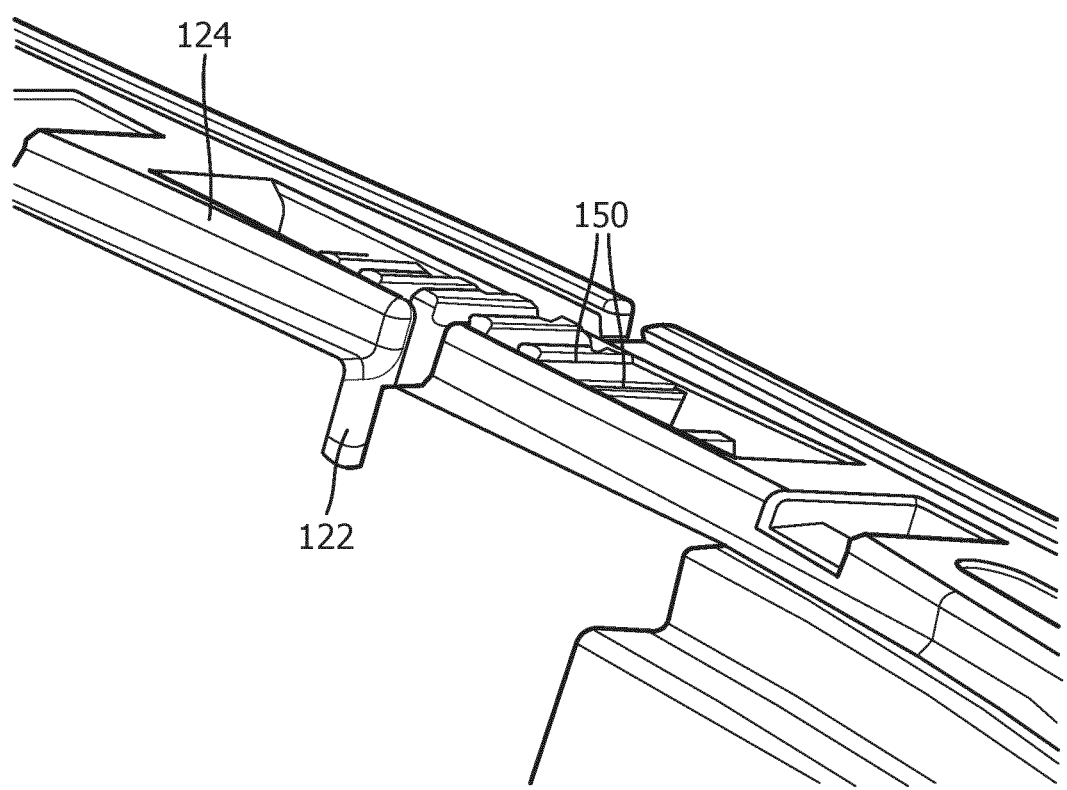
FIG. 8 provides a perspective view of the wire retention and release mechanism mounted to the housing portion shown in FIG. 6.

In some embodiments, such as that shown in FIGS. 6 to 8, the kitchen apparatus 100 comprises a wire retention and release mechanism configured to releasably retain the at least one wire 110 following receiving of the at least one wire 110 in the channel 122.

Releasably retaining the at least one wire 110 in this manner may assist to reduce the risk of the at least one wire 110 being damaged, e.g. by being pinched between the first and second housing portions 102, 104.

In some embodiments, the wire retention and release mechanism is configured to urge release of the retained wire(s) 110 in response to movement of the first and second housing portions 102, 104 relative to each other to open the food preparation chamber 106.

This release of the at least one wire 110 may assist to minimize the risk of unintentional deformation and/or disconnection of the at least one wire 110, for example at the user-accessible connection point 114, e.g. jack socket, due to the relative movement of the first and second housing portions 102, 104 to open the food preparation chamber 106.

In embodiments in which one of the first and second housing portions 102, 104 is a drawer, the length of the at least one wire 110 outside the kitchen appliance, e.g. air fryer, may be shorter than the length of travel of the drawer required to open the food preparation chamber 106.

The risk of unintentional deformation and/or disconnection of the at least one wire 110 in such embodiments may nonetheless be lessened due to the release of the at least one wire 110 implemented by the wire retention and release mechanism.

Moreover, user convenience may be enhanced, since the user need only open the food preparation chamber 106 in order to cause the wire retention and release mechanism to urge release of the retained wire(s) 110.

In the non-limiting example shown in FIGS. 6 to 8, the at least one wire 110 may be lifted upwards when being released, e.g. in a direction away from the second housing portion 104, e.g. drawer.

The wire retention and release mechanism may comprise a wire reception portion 140 configured to align with the channel 122 to enable release of the at least one wire 110 from the wire reception portion 140 via the channel 122 when the food preparation chamber 106 is open, and to be displaced relative to the channel 122 to retain the at least one wire in the wire reception portion 140 while the food preparation chamber 106 is closed.

The wire reception portion 140 may be configured to align with the channel 122 in response to the first and second housing portions 102, 104 being moved relative to each other to open the food preparation chamber 106.

In this way, the wire retention and release mechanism may urge release of the retained wire(s) 110.

Alternatively or additionally, the wire reception portion 140 may be configured to be displaced relative to the channel 122 in response to user actuation and/or to the first and second housing portions 102, 104 being moved relative to each other to close the food preparation chamber 106.

In some embodiments, the wire reception portion 140 is included in a movable member 142 mounted at one of the first and second housing portions 102, 104.

In a first set of embodiments, a biasing mechanism urges the moveable member 142 into a position in which the wire reception portion 140 is displaced relative to the channel 122. An example of this is best shown in FIGS. 6 and 7.

In this first set of embodiments, when the user wishes to insert the at least one wire 110 of the food monitoring sensor, he/she may rotate the movable member 142 against the bias to open the channel 122 to receive the at least one wire 110. The at least one wire 110 may then be inserted into the channel 122 and into the wire reception portion 140. Once the movable member 142 is subsequently released by the user, the at least one wire 110 may be retained in the wire reception portion 140, owing in part to the shape of the wire reception portion 140.

In an alternative, second set of embodiments, a biasing mechanism instead urges the moveable member 142 into a position that brings the wire reception portion 140 into alignment with the channel 122 when the first and second housing portions 102, 104 are moved relative to each other such that the food preparation chamber 106 is open.

In this second set of embodiments, the movable member 142 can also have an engagement portion 144 configured to engage a part of one of the housing portions 102, 104 when the food preparation chamber 106 is closed. When thus engaged, the engagement portion 144 is configured to restrict movement of the movable member 142, against the urging of the biasing mechanism, so as to retain displacement of the wire reception portion 140 relative to the channel 122 while the food preparation chamber 106 is closed.

Upon relative movement of the first and second housing portions 102, 104 to open the food preparation chamber 106, the biasing mechanism is enabled to urge the moveable member 142 into a position that brings the wire reception portion 140 into alignment with the channel 122, thereby releasing the retained wire(s) 110.

The above-described closure member 132 can be combined with the movable member 142 to facilitate release of the wire(s) 110.

The closure member 132 may be configured to urge the wire(s) 110 out of the wire reception portion 140 and out of the channel 122, when the wire reception portion 140 is aligned with the channel 122.

In some embodiments, and as best shown in FIGS. 6 and 7, the movement of movable member 142 may be rotation about a pivot point 146.

The biasing mechanism may comprise a spring 148 arranged to urge rotation of the movable member 142 about the pivot point 146.

In such embodiments, the movable member 142 can be regarded as a rotatable, spring-loaded gate.

In some embodiments, and as best shown in FIG. 8, the engagement portion 144 comprises a set of teeth 150. The set of teeth 150 can assist the user to rotate the movable member 142, as in the above-described first set of embodiments.

Alternatively or additionally, and in the context of the above-described second set of embodiments, the set of teeth 150 can, for instance, engage a complementarily shaped part of the first or second housing portion 102, 104 in order to restrict movement of the movable member 142 while the food preparation chamber 106 is closed.

It is noted that the movable member 142 comprising the toothed engagement portion 144 can be regarded as a bevel.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A kitchen apparatus comprising:
   a food preparation chamber;
   a first housing portion;

a second housing portion, the first housing portion and the second housing portion being movable relative to each other to enable the food preparation chamber to be opened and closed; and a channel for receiving at least one wire connected to a food monitoring sensor, at least part of the channel being at an interface between the first housing portion and the second housing portion so as to permit routing of the at least one wire received in the channel into the food preparation chamber; wherein a handle mounts to one of the first and second housing portions via a mounting portion extending between the respective housing portion and the handle, wherein at least part of the channel is arranged in the mounting portion.

2. The kitchen apparatus of claim 1, wherein one of the first and second housing portions is a drawer that is slidably moveable relative to the other of the first and second housing portions to enable the food preparation chamber to be opened and closed.

3. The kitchen apparatus of claim 1, wherein one of the first and second housing portions comprises a food basket receivable in the food preparation chamber.

4. The kitchen apparatus of claim 1, wherein at least one of the first and second housing portions comprises a rounded surface that at least partially delimits the channel.

5. The kitchen apparatus of claim 1, wherein the channel is at least partly defined by a groove arranged in an edge portion of one of the first and second housing portions, which edge portion faces a further edge portion of the other of the first and second housing portions.

6. The kitchen apparatus of claim 1, comprising a closure member arranged to close the channel when the at least one wire is not received in the channel.

7. The kitchen apparatus of claim 6, wherein the closure member is biased into a closed position in which the channel is closed by the closure member when the at least one wire is not received in the channel.

8. The kitchen apparatus of claim 1, comprising a wire retention and release mechanism configured to releasably retain the at least one wire following receiving of the at least one wire in the channel.

9. The kitchen apparatus of claim 8, wherein the wire retention and release mechanism is configured to urge release of the retained wire(s) in response to movement of the first and second housing portions relative to each other to open the food preparation chamber.

10. The kitchen apparatus of claim 8, wherein the wire retention and release mechanism comprises a wire reception portion configured to align with the channel to enable release of the at least one wire from the wire reception portion via the channel when the food preparation chamber is open, and to be displaced relative to the channel to retain the at least one wire in the wire reception portion while the food preparation chamber is closed.

11. The kitchen apparatus of claim 1, comprising a user-accessible connection point at which the at least one wire is electrically connectable to a cooking control and monitoring system.

12. The kitchen apparatus of claim 1, comprising the at least one wire, and said food monitoring sensor arrangeable in the food preparation chamber to monitor food received therein while the at least one wire is routed via the channel from the food monitoring sensor to outside the food preparation chamber.

13. The kitchen apparatus of claim 1, wherein the kitchen apparatus comprises an air fryer.

14. The kitchen apparatus of claim 1, comprising a heating element, and a circulation system arranged to circulate gas heated by the heating element in the food preparation chamber; wherein the food preparation chamber has, when orientated for use, a top and a bottom, the circulation system being arranged to circulate said gas upwardly through food received in the food preparation chamber in the direction of the top or downwardly through food received in the food preparation chamber in the direction of the bottom.

* * * * *